United States Patent
Nakayama

[11] Patent Number: 5,272,635
[45] Date of Patent: Dec. 21, 1993

[54] TORQUE DISTRIBUTION CONTROL APPARATUS FOR FOUR WHEEL DRIVE

[75] Inventor: Yasunari Nakayama, Hiroshima, Japan

[73] Assignee: Mazda Motor Corporation, Hiroshima, Japan

[21] Appl. No.: 713,772

[22] Filed: Jun. 12, 1991

[30] Foreign Application Priority Data

Jun. 14, 1990 [JP] Japan ................................. 2-156272

[51] Int. Cl.⁵ ............................................. B60K 17/34
[52] U.S. Cl. ............................ 364/426.02; 180/197; 180/233
[58] Field of Search ........... 364/424.1, 426.02, 426.03; 180/197, 234, 244, 245, 233

[56] References Cited

U.S. PATENT DOCUMENTS

| | | | |
|---|---|---|---|
| 4,776,424 | 10/1988 | Naito | 180/197 |
| 4,874,056 | 10/1989 | Naito | 180/233 |
| 4,941,541 | 7/1990 | Ito et al. | 180/234 |
| 4,953,654 | 9/1990 | Imaseki et al. | 180/197 |
| 4,967,869 | 11/1990 | Nagaoka et al. | 180/244 |
| 5,105,901 | 4/1992 | Watanabe et al. | 180/245 |
| 5,126,942 | 6/1992 | Matsuda | 364/426.02 |

FOREIGN PATENT DOCUMENTS 1247221 3/1988 Japan .
1247223 3/1988 Japan .

*Primary Examiner*—Gary Chin
*Attorney, Agent, or Firm*—Sixbey, Friedman, Leedom & Ferguson

[57] ABSTRACT

The driving torque distribution for four wheels of a car is controlled correspondingly to the running state. It is considered that disturbance causes a lateral acceleration or yaw rate which is equal to or greater than a predetermined value at the time of straight running. In this case, even if a steering angle is changed by a driver's corrective steering, there is not executed the torque distribution control suitable for turning start so that the running stability of the car can be ensured.

4 Claims, 7 Drawing Sheets

TORQUE DISTRIBUTION CONTROL APPARATUS FOR FOUR WHEEL DRIVE

BACKGROUND OF THE INVENTION

The present invention relates to a torque distribution control apparatus for a four wheel drive.

In general, there has been known a torque distribution control apparatus for a four wheel drive which drives four wheels by engine outputs, wherein the torque distribution for each wheel is not always equivalent but is variably controlled so as to become optimum correspondingly to operating conditions.

Japanese Unexamined Patent Publication No. 1-247223 has disclosed that the turning movement of the car is classified under three parts at the time of turning start, during constant turning and at the time of turning escape, so that torque distribution control is executed correspondingly to the turning state of the car on the basis of a steering angle and a change rate thereof for front wheels. In other words, the brake absorbs the driving force of the front wheels to decrease the torque distribution for the front wheels such that the small turn of the car can be enhanced at the time of turning start. On the other hand, the brake absorbs the driving force of the rear wheels to decrease the torque distribution for the rear wheels such that the straightness can be enhanced at the time of turning escape. Consequently, the burden of the front and rear tires can become uniform. The torque distribution is uniformly executed for the front and rear wheels in the state of straight running.

The car moves unsteadily owing to a great side wind at the time of straight running. Also in the case where the car moves straight by virtue of excessive driving force, the slip may easily be caused on the wheels so as to move unsteadily. When the car moves unsteadily, a driver corrects steering. In that case, the steering angle is changed. Consequently, it is decided that the car is in the state of turning start. Accordingly, there is executed the torque distribution control at the time of turning correspondingly to the steering state.

When the torque distribution control at the time of turning start is executed against unsteady movement, the torque distribution for the rear wheels is increased. Consequently, the slip of the rear wheels is increased so that the movement of the car tends to be undesirably changed. In the case where a friction coefficient (hereinafter referred to as $\mu$ if necessary) of a road is low, the above-mentioned tendency is made remarkable.

SUMMARY OF THE INVENTION

It is an object of the present invention to facilitate a driver's corrective steering in the case where a car moves unsteadily at the time of straight running.

It is another object of the present invention to execute torque distribution control which attaches great importance to the running stability of the car by deciding that the car moves unsteadily owing to disturbance at the time of straight running.

The present invention provides a torque distribution control apparatus comprising torque distribution change means for controlling a quantity of engine outputs to be transmitted to four wheels so as to change the driving torque distribution for the four wheels, means for detecting the steering state of the car, means for detecting a lateral acceleration or yaw rate generated on the car, running state decision means for deciding whether the car is in the state of straight running, turning start or turning escape on the basis of the steering state thereof, torque distribution control means for differently setting the torque distribution ratios of the four wheels at the time of straight running, turning start and turning escape decision and for controlling the torque distribution change means on the basis of the torque distribution ratios thus set, and torque distribution control regulation means for considering as the disturbance the lateral acceleration or yaw rate which is equal to or greater than a predetermined value when the running state decision means decides that the car is in the state of straight running and for forbidding the torque distribution control of the torque distribution control means based on the running start decision obtained by the running state decision means.

In this case, braking devices of the wheels are controlled to adjust the quantity of the engine outputs to be transmitted, so that the change of the torque distribution can be executed.

Referring to the torque distribution control apparatus, the running state decision means decides whether the car is in the state of straight running, turning start or turning escape on the basis of the results obtained by the steering state detection means. The torque distribution control means controls the torque distribution for the four wheels on the basis of the results of decision.

In the case where the running state decision means decides that the car is in the state of straight running. As a result of detection by the steering state detection means, the subsequent torque distribution control is changed depending on whether the lateral acceleration or yaw rate, which is equal to or greater than the predetermined value, is generated on the car.

When the lateral acceleration or yaw rate is smaller than the predetermined value in the state of straight running, the decision of straight running is obtained so that the torque distribution suitable for straight running is executed.

When the lateral acceleration or yaw rate is equal to or greater than the predetermined value, the torque distribution control at the time of running start decision is forbidden by the torque distribution control regulation means until the lateral acceleration or yaw rate, which is equal to or greater than the predetermined value, is eliminated.

In the case where the driver corrects steering against the unsteady movement of the car caused by the disturbance (a side wind or excessive driving torque) in the state of straight running, the torque distribution control at the time of turning start decision is not executed even if the state of the car is changed to turning start.

Accordingly, there can be executed the torque distribution control to reduce the torque distribution for the front wheels (i.e., to increase the torque distribution for the rear wheels) in order to enhance the small turn of the car at the time of turning start. More specifically, when the disturbance occurs in the state of straight running, the torque distribution for the rear wheels is not increased with the driver's steering. The driver's steering can prevent the unsteady movement of the car from being promoted. In addition, the driver can easily correct the steering. Consequently, the straight running of the car can be enhanced.

Referring to a preferred embodiment of the present invention, the torque distribution control regulation means forcibly makes the torque distribution control means execute the torque distribution control at the time of turning escape decision irrespective of the decision obtained by the running state decision means.

Thus, when the disturbance occurs in the state of straight running, there can be executed the torque distribution control at the time of turning escape decision which attaches great importance to the running stability of the car. The driver can correct the steering more easily, so that the straight running of the car can be enhanced.

In that case, referring to a preferred embodiment, the torque distribution control means sets the torque distribution ratio of the front wheels to the rear wheels such that the torque distribution for the rear wheels is made smaller at the time of turning escape decision than at the time of straight running and turning start decision.

Thus, even if the driver executes the steering when the disturbance occurs in the state of straight running, the torque distribution for the rear wheels is decreased. Consequently, there is not caused the slip of the rear wheels owing to the excessively driving torque. As a result, the running state of the car can be stabilized.

Referring to another preferred embodiment, the torque distribution control regulation means includes disturbance decision means and turning escape decision termination means. The disturbance decision means considers as the disturbance the lateral acceleration or yaw rate which is equal to or greater than the predetermined value when the running state decision means decides that the car is in the state of straight running, stops the decision of the running state decision means and gives the turning escape decision to the torque distribution control means in order to make the torque distribution control means execute the torque distribution control at the time of turning escape decision. The turning escape decision termination means terminates the turning escape decision and restarts the decision of the running state decision means when the steering angle is smaller than a predetermined values, and the lateral acceleration or yaw rate are smaller than the predetermined values in the case where the turning escape decision is given to the torque distribution control means.

Thus, when the disturbance occurs in the state of straight running, the torque distribution control means can execute the torque distribution control at the time of turning escape decision. As long as the disturbance is continued, there is continuously executed the torque distribution control at the time of turning escape decision. If the disturbance is temporarily eliminated by the driver's correction (the lateral acceleration or yaw rate is smaller than the predetermined value) and the steering angle is equal to or greater than the predetermined value, it is decided that the driver is correcting the steering. Consequently, there is continued the torque distribution control at the time of turning escape decision. As a result, the torque distribution control can be prevented from being early terminated.

These and other objects, features and advantages of the present invention will become more apparent upon a reading of the following detailed description and drawings.

DETAILED DESCRIPTION OF A PREFERRED EMBODIMENT

A preferred embodiment of the present invention will be described with reference to the drawings.

Explanation of an entire structure

Figure 1:
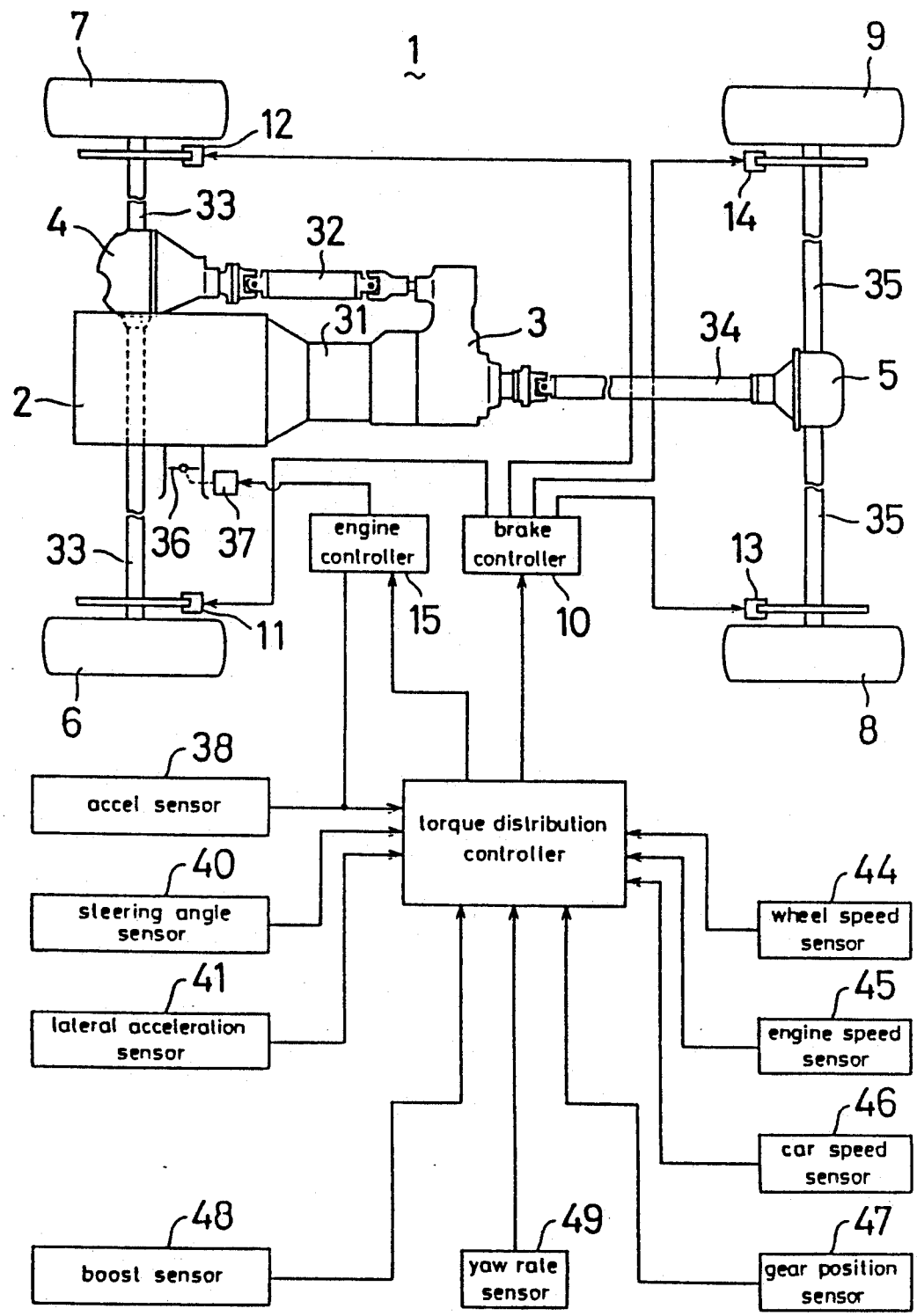
FIG. 1 is a diagram showing the entire structure according to an embodiment of the present invention.

As shown in FIG. 1, an output of an engine 2 is inputted to a transfer 3 through a transmission 31. The transfer 3 has a center differential for equally transmitting an engine output to front and rear wheel sides. A front differential 4 is connected to an output shaft 32 on the front wheel side of the transfer 3. Right and left front wheels 6 and 7 are connected to the front differential 4 through a front wheel driving shaft 33. Similarly, a rear differential 5 is connected to an output shaft 34 on the rear wheel side of the transfer 3. Right and left rear wheels 8 and 9 are connected to the rear differential 5 through a rear wheel driving shaft 35.

A brake controller 10 which may be referred to as torque distribution change means includes a braking pressure control valve and an actuator. The braking pressure control valve separately controls the braking pressure to be supplied to braking devices 11 to 14 provided on the wheels 6 to 9. A throttle valve 36 of the engine 2 has its opening adjusted by a throttle motor 37.

An engine controller 15 which may be referred to as engine output change means receives an accel signal from an accel sensor 38 which detects a quantity of accel operated by a driver, and then, outputs an operation control signal to the throttle motor 37 so as to adjust the opening of the throttle valve 36 correspondingly to the quantity of accel operated by the driver. In addition, the engine controller 15 receives a control signal from a torque distribution controller 16 as torque distribution control means and changes the engine output in order to obtain the engine output torque required to change torque distribution.

The torque distribution controller 16 receives signals from the accel sensor 38, and various signals for measuring an operation quantity or momentum to control the torque distribution for the wheels 6 to 9. Then, the torque distribution controller 16 outputs a control signal to the brake controller 10 and the engine controller 15. Output sources for the various signals are as follows;

a steering angle sensor 40, a lateral acceleration sensor 41 for detecting a lateral acceleration of a car, a wheel speed sensor 44 for detecting an engine speed of the wheels 6 to 9, an engine speed sensor 45 for detecting the engine speed, a car speed sensor 46, a gear position sensor 47 for detecting a gear position (gear speed) of a transmission 25, a boost sensor 48 for detecting a boost of the engine 2, and a yaw rate sensor 49 for detecting a yaw rate of the car.

The torque distribution controller 16 includes distribution ratio setting means, running state decision means and the like. The distribution ratio setting means sets a torque distribution ratio R1 (hereinafter referred to as a longitudinal distribution ratio if necessary) of the front wheels 6 and 7 to the rear wheels 8 and 9 and a torque distribution ratio R2 (hereinafter referred to as a lateral distribution ratio if necessary) of the left wheels 6 and 8 to the right wheels 7 and 9 depending on the running state of the car.

Figure 2:
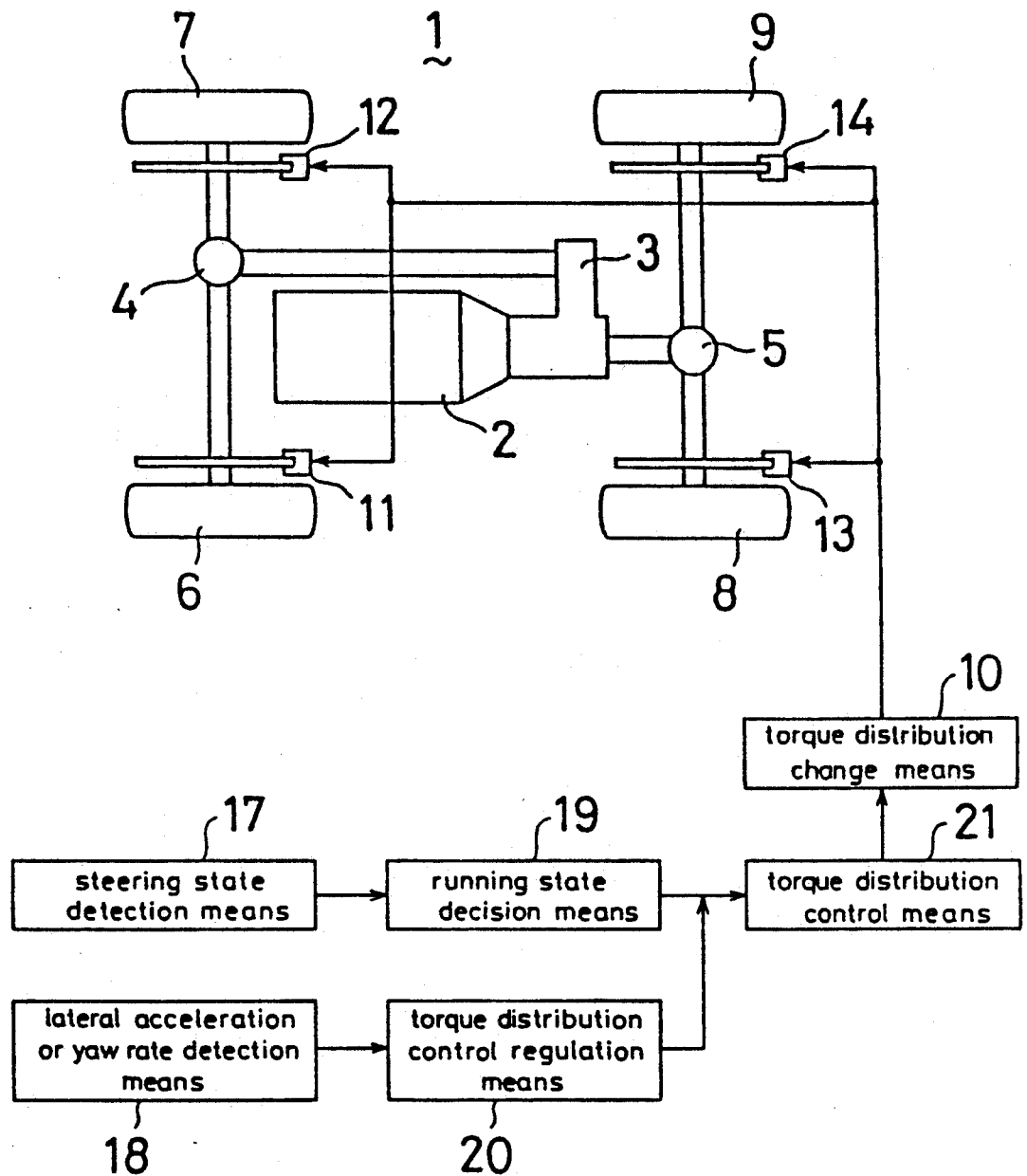
FIG. 2 is a control system diagram.

FIG. 2 is a control system diagram according to the present invention.

First, torque distribution control means 21 sets the torque distribution ratios and controls the torque distribution change means 10 on the basis of the torque distribution ratios thus set. There are provided running state decision means 19 and torque distribution control regulation means 20 for setting the torque distribution ratios.

The running state decision means 19 receives a detection signal from steering state detection means 17, (which corresponds to the steering angle sensor 40) so as to decide whether the car is in the state of straight running, turning start or turning escape. Thus, the torque distribution control means 21 differently sets the torque distribution ratios for the wheels 6 to 9 at the time of straight running, turning start and turning escape decision. In addition, the torque distribution control means 21 controls the torque distribution change means on the basis of the torque distribution ratios thus set.

If it is decided that the car is in the state of straight running by the running state decision means 19, the torque distribution control regulation means 20 considers as disturbance the lateral acceleration or yaw rate which is equal to or greater than a predetermined value, and forbids the torque distribution control of the torque distribution control means on the basis of the turning start decision obtained by the running state decision means.

Explanation of the brake controller 10

Figure 3:
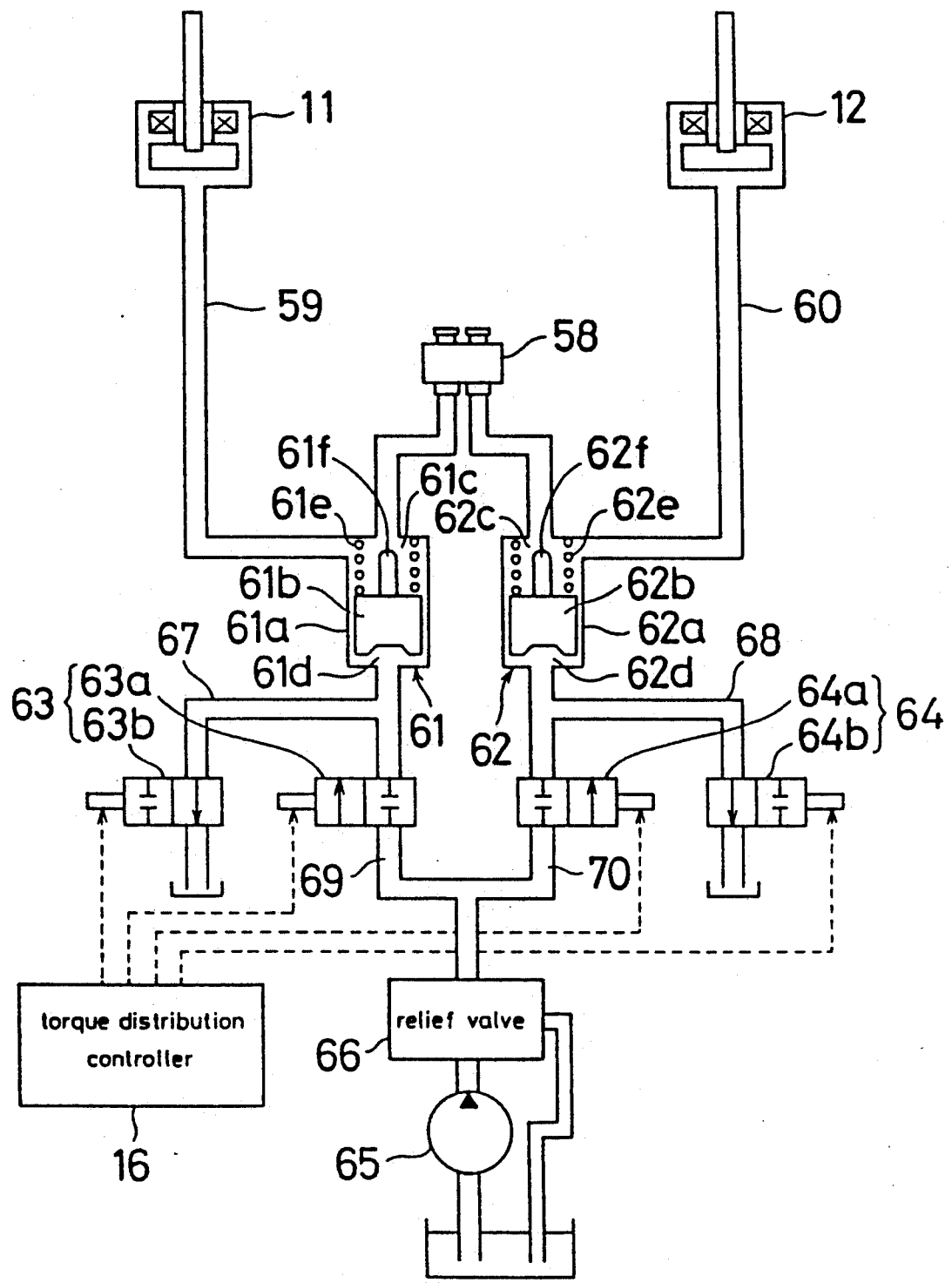
FIG. 3 is a circuit diagram showing torque distribution change means.

In FIG. 3, at 59 is indicated a first hydraulic line for the braking device 11 of the left front wheel 6, and at 60 is indicated a second hydraulic line for the braking device 12 of the right front wheel 7. The first and second hydraulic lines 59 and 60 have first and second braking pressure control valves 61 and 62 provided therebetween. The first and second braking pressure control valves 61 and 62 control the supply of the braking pressure. In addition, the first and second braking pressure control valves 61 and 62 have cylinders 61a and 62a partitioned into variable volume chambers 61c and 62c, and control chambers 61d and 62d by pistons 61b and 62b. The variable volume chambers 61c and 62c supply the braking pressure generated by a master cylinder 58 to the braking devices 11 and 12.

The pistons 61b and 62b are energized such that the volume of the variable volume chambers 61c and 62c is increased by springs 61e and 62e, and move such that the variable volume chambers 61c and 62c are reduced against the springs 61e and 62e by the control pressure introduced into the control chambers 61d and 62d. Furthermore, the pistons 61b and 62b have check valves 61f and 62f for closing braking pressure inlets of the variable volume chambers 61c and 62c according to the movement mentioned above. Accordingly, the control pressure is introduced into the control chambers 61d and 62d so that the pistons 61b and 62b move against the springs 61e and 62e. Consequently, there is blocked the space between the master cylinder 58 and the variable volume chambers 61c and 62c. In addition, the braking pressure in thevariable volume chambers 61c and 62c is supplied to the braking devices 11 and 12.

There are provided first and second actuators 63 and 64 having pressure increasing electromagnetic valves 63a and 64a and pressure reducing electromagnetic valves 63b and 64b to operate the braking pressure control valves 61 and 62. The pressure increasing electromagnetic valves 63a and 64a are provided on control pressure supply lines 69 and 70. The control pressure supply lines 69 and 70 are lead to the control chambers 61d and 62d of the braking pressure control valves 61 and 62 through an oil pump 65 and a relief valve 66. The pressure reducing electromagnetic valves 63b and 64b are provided on drain lines 67 and 68 which are lead from the control chambers 61d and 62d. The electromagnetic valves 63a, 63b, 64a and 64b are opened or closed by the signals from the torque distribution controller 16. When the pressure increasing electromagnetic valves 63a and 64a are opened and the pressure reducing electromagnetic valves 63b and 64b are closed, the control pressure is introduced into the control chambers 61d and 62d of the braking pressure control valves 61 and 62. When the pressure increasing electromagnetic valves 63a and 64a are closed and the pressure reducing electromagnetic valves 63b and 64b are opened, the control pressure is discharged from the control chambers 61d and 62d.

The braking devices 13 and 14 of the right and left rear wheels 8 and 9, which are not shown, have the same structures as those of the braking devices 11 and 12 of the front wheels 6 and 7. With the above-mentioned structures, the independent braking pressure can be applied to the braking devices 11 to 14.

There will be described the torque distribution controller 16.

Explanation of the entire flow of processing

When a predetermined measurement timing is obtained after starting, the accel stroke, steering angle, lateral acceleration, wheel speed, engine speed, car speed, gear position, boost, and actual yaw rate are measured by the signals from the sensors 38, 40, 41 and 44 to 49 shown in FIG. 2. The longitudinal and lateral distribution ratios R1 and R2 are set correspondingly to the turning state so that the brake controller 10 and engine controller 15 are controlled.

According to the present embodiment, the longitudinal distribution ratio R1 is set such that the longitudinal distribution is uniform at 0, the driving torque of the front wheels 6 and 7 is 0 (and that of the rear wheels 8 and 9 is the maximum) at +0.5, and the driving torque of the rear wheels 8 and 9 is 0 (and that of the front wheels 6 and 7 is the maximum) at −0.5. The lateral distribution ratio R2 is set such that the lateral distribution is uniform at 0, the driving torque of the left wheels 6 and 8 is 0 (and that of the right wheels 7 and 9 is the maximum) at +0.5, and the driving torque of the right wheels 7 and 9 is 0 (and that of the left wheels 6 and 8 is the maximum) at −0.5.

Turning state correspondence control

Basically, the longitudinal distribution ratio R1 is determined on the basis of the lateral slide (slide skid) angle of the rear wheels 8 and 9. In addition, the lateral distribution ratio R2 is determined so as to obtain a target yaw rate. The distribution ratios R1 and R2 are corrected correspondingly to the turning state of the car.

Figure 4:
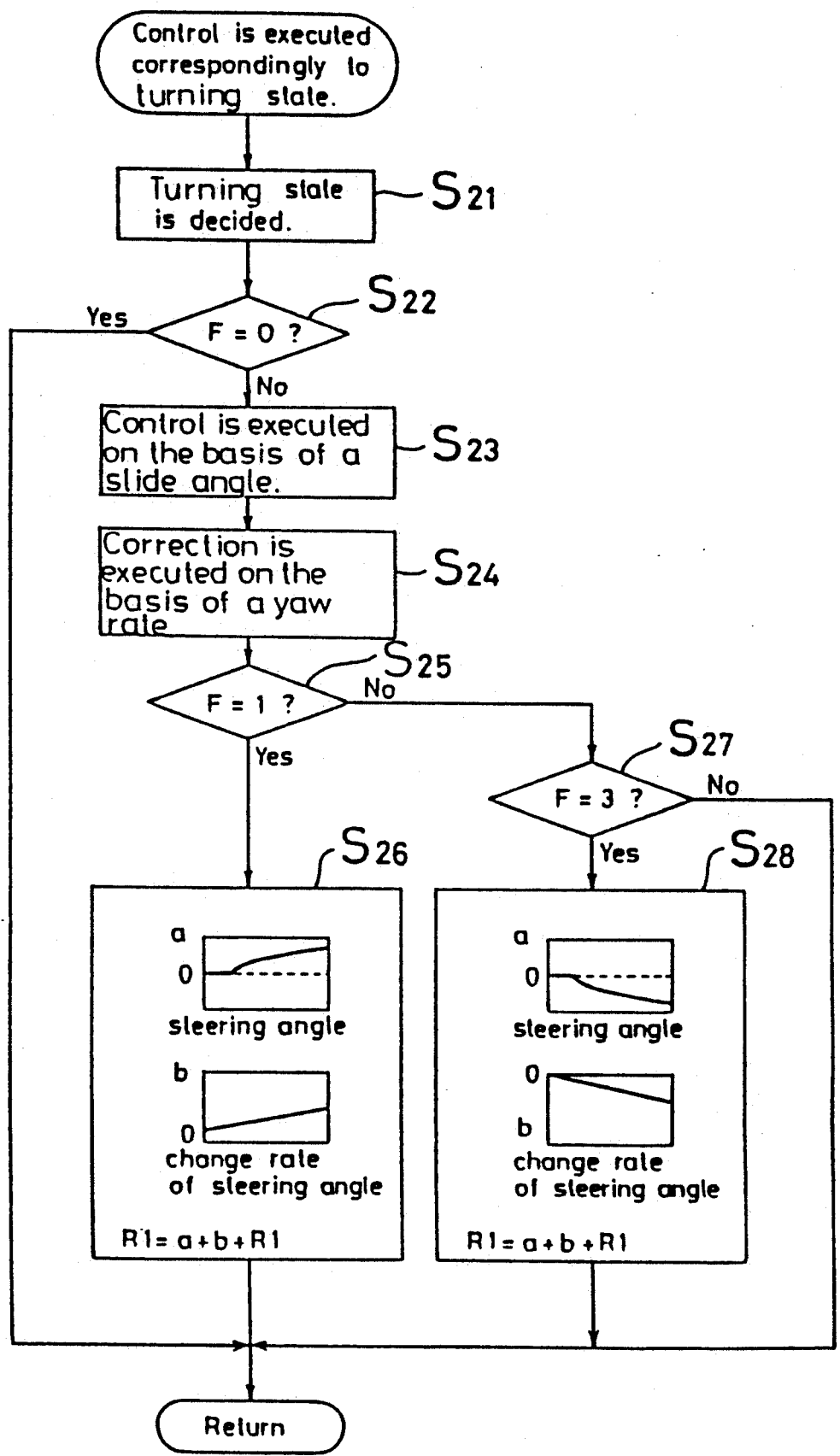
FIG. 4 is a flow chart for turning state correspondence control.

More specifically, the control is executed in accordance with a flow shown in FIG. 4. A turning state decision flag F is used for the control. The flag F means the following.

|  |  |
| --- | --- |
| F = 0 | straight running |
| F = 1 | turning start |
| F = 2 | constant turning |
| F = 3 | turning escape |

Referring to the present control, the turning state is decided (Step S21). If the car is in the state of turning (Step S22), the longitudinal distribution ratio R1 is determined depending on the lateral slide angle of the rear wheels 8 and 9 and the lateral distribution ratio R2 is then determined depending on the yaw rate (Steps S23 and S24). If the car is in the state of turning start and turning escape, the longitudinal distribution ratio R1 is corrected and controlled on the basis of the steering angle and change rate thereof (Steps S25 to S28).

Decision of turning state (Step S21)

Figure 5:
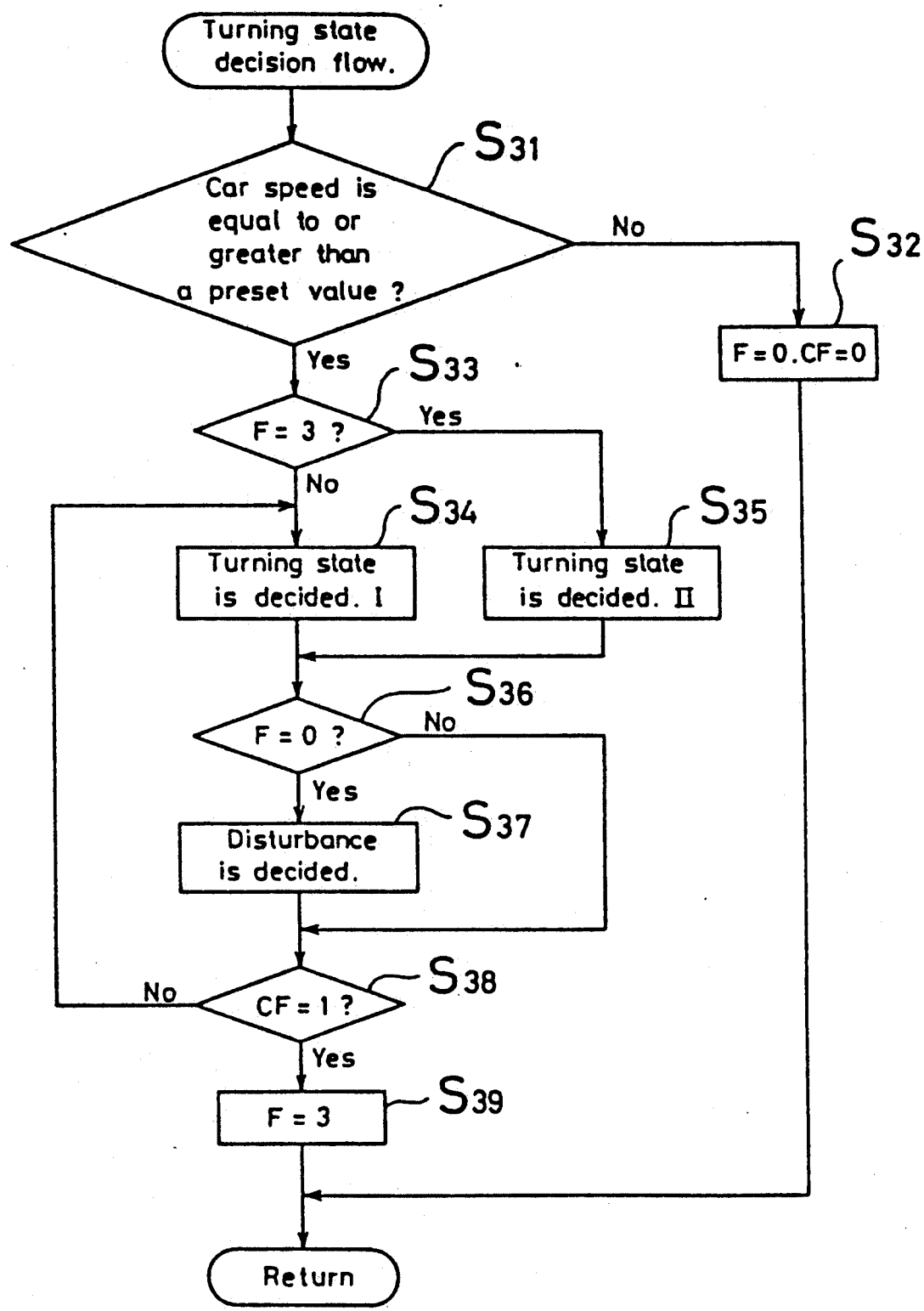
FIG. 5 is a flow chart for turning state decision.

The flow of decision control is shown in FIG. 5. Basically, the turning state of the car is decided depending on the steering angle and change rate thereof obtained by the steering angle sensor 40. The results of decision are corrected by the lateral acceleration and yaw rate obtained by the lateral acceleration sensor 41 and yaw rate sensor 49 respectively. A second flag CF is used for correction. The CF flag means the following.

CF = 0 ... Correction is not necessary for the change of movement of the car.

CF = 1 ... Correction is necessary for the change of movement of the car.

When the car speed is smaller than a preset value (the car speed is extremely low), the lateral slide of the car does not matter. Consequently, F and CF are set to 0 irrespective of the steering angle and change rate thereof (Steps S31 and S32). At Step S33, it is decided whether the former decision is F=3 (turning escape) or not. If the former decision is not F=3, turning state decision I is carried out in accordance with a map shown in FIG. 6 (Step S34). The running state decision means is constructed by the turning state decision I. The contents of decision are as follows.

The steering angle is smaller than $\theta 1$ and the change rate of steering angle is smaller than $\dot{\theta} 1$;
  F=0 (straight running),
  CF=CF (CF setting is not changed)
The steering angle is equal to or greater than $\theta 1$, and the change rate of steering angle is a positive number (the steering angle is increased) and is equal to or greater than $\dot{\theta} 2$,
or the change rate of steering angle is equal to or greater than $\dot{\theta} 1$;
  F=1 (turning start),
  CF=CF
The steering angle is equal to or greater than $\theta 1$ and the change rate of steering angle is $\dot{\theta} 2$ to $\dot{\theta} 3$;
  ($\dot{\theta} 3$ is a negative number: the steering angle is decreased)
  F=2 (constant turning),
  CF=CF
The steering angle is equal to or greater than $\theta 1$ and the change rate of steering angle is $\dot{\theta} 3$ to $\dot{\theta} 4$;
  ($\dot{\theta} 3 > \dot{\theta} 4$)
  F=3 (turning escape),
  CF=CF
The change rate of steering angle is smaller than $\dot{\theta} 4$;
  F=3,
  CF=1

Figure 7:
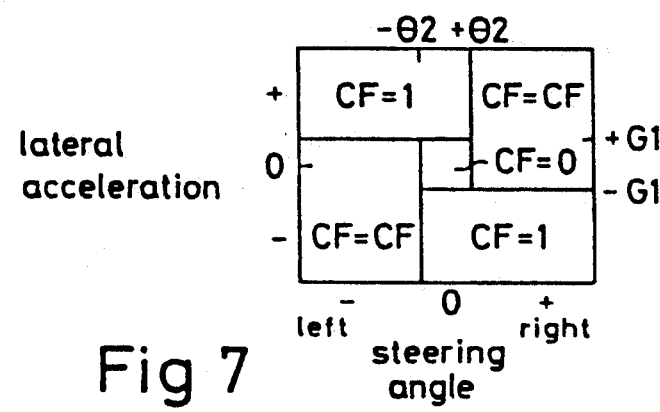
FIG. 7 is a map chart for turning state decision II.

If the decision is F=3 (turning escape) in Step S33, turning state decision II is carried out in accordance with a map shown in FIG. 7 (Step S35). Even if the steering is completed at the time of turning escape (the steering angle is about 0), it is decided that correction is necessary for the change of movement of the car (turning escape) until the absolute value of the lateral acceleration is smaller than a predetermined value |G1|. Consequently, CF is set. In addition, the lateral acceleration is added to decision conditions. Thus, the turning state decision II also serves as disturbance decision termination means (turning escape decision termination means) in the state of straight running.

The steering angle is smaller than $+\theta 2$ (the entire region of the left steering angle, and the right steering angle from 0 to a predetermined value $+\theta 2$) and the lateral acceleration is equal to or greater than $+G1$ (a rightward acceleration is about 0), or the steering angle is equal to or greater than $-\theta 2$ (the entire region of the right steering angle, and the left steering angle from 0 to a predetermined value $-\theta 2$) and the lateral acceleration is smaller than $-G1$ (a leftward acceleration is about 0); CF=1.

The steering angle is $+\theta 2$ to $-\theta 2$ and the lateral acceleration is $+G1$ to $-G1$; CF=0

Other regions; CF=CF

Figure 8:
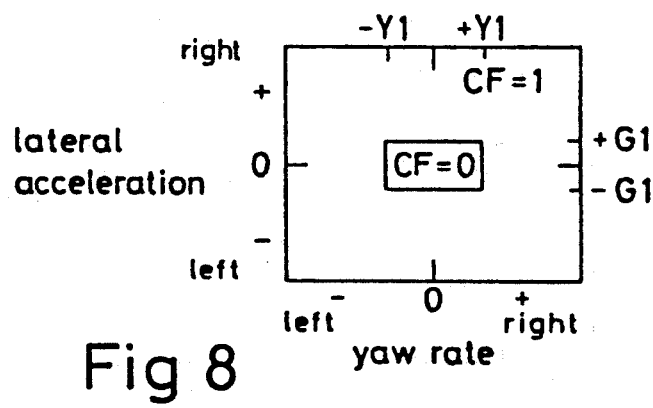
FIG. 8 is a map chart for disturbance decision.

If F=0 (straight running), disturbance decision is carried out in accordance with a map shown in FIG. 8 (Steps S36 and S37). Only in the case where the yaw rate is $-Y1$ to $+Y1$ and the lateral acceleration is $-G1$ to $+G1$, CF is set to 0. In other cases, the disturbance occurs (it is necessary to correct the change of movement of the car) so that CF is set to 1.

As a result of decision, if CF is set to 1, the turning state decision flag F is forced to be 3 (turning escape) and is continuously set to 3 until CF is equal to 0. If CF is set to 0, the turning state decision I is carried out (Steps S38 and S39).

Lateral slide angle control (Step S23)

Figure 9:
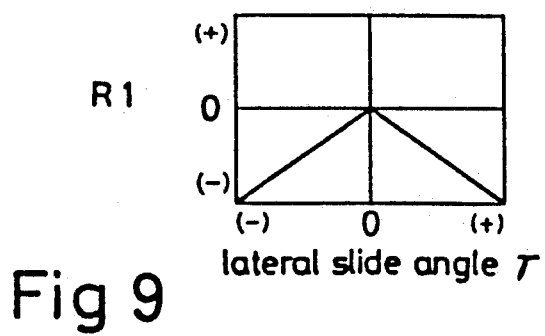
FIG. 9 is a map chart for setting a longitudinal torque distribution ratio depending on a lateral slide (side skid) angle.

The longitudinal distribution ratio R1 is determined depending on the lateral slide angle by means of the steering angle sensor 40, car speed sensor 46 and yaw rate sensor 49. In other words, there is obtained by the following formula a lateral slide angle $\gamma$ of the rear wheels 8 and 9 owing to the yaw movement of the car. With reference to a characteristic map shown in FIG. 9, the longitudinal distribution ratio R1 is determined.

$\gamma = \text{Yaw.r} \cdot l_r / V$

Yaw.r; actual yaw rate l r; distance from the center of gravity to the rear wheels of the car
V; car speed In this case, the lateral slide angle $\gamma$ is equal to 0, the longitudinal distribution ratio R1 is equal to 0. If the lateral slide angle $\gamma$ is increased in plus and minus directions, the longitudinal distribution ratio R1 is increased in the minus direction. Referring to the yaw rate Yaw.r, the right turning is set in the plus direction. Accordingly, $\gamma$ having a plus or minus sign corresponds to the right or left turning of the car.

Yaw rate correction

The lateral distribution ratio R2 is determined depending on the yaw rate as follows. First, there is calculated the target yaw rate Y.cal on the high $\mu$ road by the lowest wheel speed v of the wheels 6 to 9, steering angle $\theta$ and wheel base $\theta$. Then, the lateral distribution ratio R2 is feed-back controlled so as to obtain the target yaw rate Y.cal from the difference between the target yaw rate Y.cal and the actual yaw rate Yaw.r.

Figure 10:
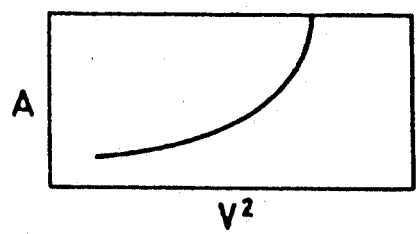
FIG. 10 is a characteristic chart showing the relationship between a wheel speed and a factor A.

In this case, the target yaw rate Y.cal is obtained by the following formula.

$$Y.cal = v/(1+Av^2) \cdot \theta/l$$

where A is a factor for obtaining the characteristic of movement of the car on the high $\mu$ road. The factor A is found with reference to a characteristic map shown in FIG. 10.

Figure 11:
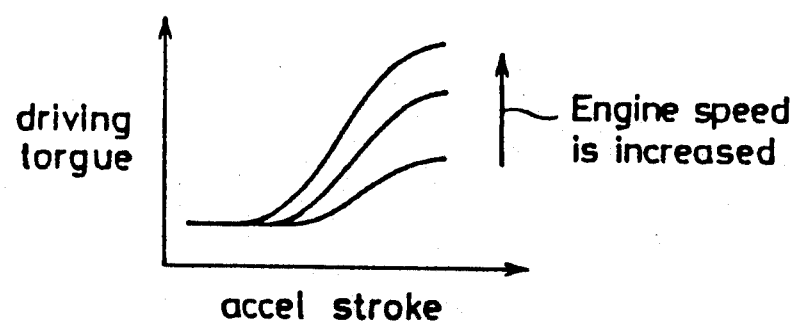
FIG. 11 is a characteristic chart showing the relationship between a driver's required torque and an accel stroke.

There is obtained $\Delta Y = Y.cal - Yaw.r$. There is obtained a driving torque difference of the right and left wheels corresponding to $\Delta Y$. Then, there is found a ratio of the driving torque difference to a driver's required torque. The ratio thus obtained is the lateral distribution ratio R2.

$$R2 = k \cdot \Delta Y / Tr$$

where k is a constant for obtaining the driving torque difference of the right and left wheels corresponding to $\Delta Y$, and Tr is the driver's required torque. Tr can be obtained as follows. In other words, an accel stroke and an engine speed (RPM) are detected by the accel sensor 38 and the engine speed sensor 45. The driving torque of the engine is calculated on the basis of the accel stroke and engine speed (RPM) with reference to a map shown in FIG. 11. The driving torque thus obtained is multiplied by a gear ratio detected by the gear position sensor 47.

Correction of R1 on the basis of the results of turning state decision

As seen from the characteristic chart for correction factors a and b and the formula for R1 (R1=a+b+R1) in Step S26, R1 is corrected so as to be increased when the steering angle and change rate thereof are increased at the time of turning start (F=1).

As seen from the characteristic chart for the correction factors a and b and the formula for R1 (R1=a+b+R1) in Step S28, R1 is corrected so as to be decreased when the steering angle and change rate thereof are increased at the time of turning escape (F=3).

Engine and brake control

By the following formula is calculated a torque Ts which is required to execute the torque distribution control depending on the longitudinal distribution ratio R1 and the lateral distribution ratio R2 set by the turning state correspondence control.

$$Ts = 4 \times (|R1| + 0.5) \times (|R2| + 0.5) \times Tr$$

The engine controller 15 is controlled in order to obtain the required torque Ts. By the following formulas are calculated the braking torques TBFR (right front wheel), TBFL (left front wheel), TBRR (right rear wheel) and TBRL (left rear wheel) to be applied to the wheels 6 to 9 on the basis of the distribution ratios R1 and R2. The brake controller 10 is controlled in order to obtain the braking torques mentioned above.

$$TBFR = Ts - 4(0.5 - R1) \times (0.5 + R2) \times Ts$$

$$TBFL = Ts - 4(0.5 - R1) \times (0.5 - R2) \times Ts$$

$$TBRR = Ts - 4(0.5 + R1) \times (0.5 + R2) \times Ts$$

$$TBRL = Teng - 4(0.5 + R1) \times (0.5 - R2) \times Ts$$

Function of an embodiment

There will be described the cases where the turning start, constant turning and turning escape are carried out at a higher car speed than a preset one and where the disturbance occurs in the state of straight running.

Turning start

The longitudinal distribution ratio R1 is set by the lateral slide angle control such that the torque distribution for the rear wheels 8 and 9 is decreased when the lateral slide angle $\gamma$ of the rear wheels 8 and 9 is increased. In the case where the decision of F=1 (turning start) is obtained by the turning state decision I (see FIG. 6), the correction factors a and b are increased when the steering angle and change rate thereof are increased by the correction control in Step S26 shown in FIG. 4. Consequently, the longitudinal distribution ratio R1 is set to be increased in the plus direction, i.e., the torque distribution for the front wheels 6 and 7 is decreased. As a result, the driving force of the front wheels 6 and 7 is absorbed by the brake so that the torque distribution for the front wheels 6 and 7 is decreased. Thus, the small turn of the car can be enhanced.

The lateral distribution ratio R2 is set by feed-back control such that the target yaw rate on the high $\mu$ road can be obtained by yaw rate correction. Consequently, the great yaw rate can be obtained on the low $\mu$ road so that the small turn of the car can be enhanced.

Constant turning

In the case where the decision of F=2 (constant turning) is obtained by the turning state decision I, the longitudinal distribution ratio R1 is not corrected and controlled by the steering angle and the like. However, when the turning of the car is continued on the low $\mu$ road, the lateral slide angle $\gamma$ of the rear wheels 8 and 9 is increased. Consequently, the longitudinal distribution ratio R1 is increased in the minus direction by the lateral slide angle control. Accordingly, the torque distribution for the rear wheels 8 and 9 is decreased so that the lateral slide of the rear wheels 8 and 9 can be prevented from being increased on the low $\mu$ road.

Turning escape

In the case where the decision of F=3 (turning escape) is obtained by the turning state decision I, the longitudinal distribution ratio R1 is increased in the minus direction by the lateral slide angle control and the correction control at the time of turning escape in Step S28 shown in FIG. 4 (both a and b are negative numbers). Consequently, the torque distribution for the rear wheels 8 and 9 is greatly decreased so that the lateral slide of the rear wheels 8 and 9 can be controlled.

If F is once set to 3, the turning state decision I and the disturbance decision are not carried out but the turning state decision II is carried out. When the turning escape is continued, the steering angle finally becomes 0 or a number having a reverse sign (for example, the sign is changed from plus to minus). Also in that case, if the lateral acceleration is equal to or greater than a predetermined value G1, CF=1 is maintained by the turning state decision II. Accordingly, the decision of F=3 (turning escape) is maintained.

Also after the completion of the turning, the longitudinal distribution ratio R1 is increased in the minus direction by the correction control at the time of turning escape in Step S28 shown in FIG. 4. Consequently, the torque distribution for the rear wheels 8 and 9 are limited so that the lateral slide of the rear wheels 8 and 9 are controlled. Thus, the straight running of the car can smoothly be carried out.

When the lateral acceleration is smaller than the predetermined value G1, CF is set to 0 by the turning state decision II. Consequently, the decision is NO in Step S38 to proceed to the turning state decision I.

Also in the cases where the change rate of steering angle is about 0, i.e., the constant turning is carried out before or after the steering angle is 0 and where the steering angle is increased again so that the turning is started, CF=1 is continued until the lateral acceleration is smaller than the predetermined value G1. Consequently, the decision of turning escape is maintained. Thus, the torque distribution for the rear wheels 8 and 9 can be prevented from being increased irrespective of the lateral slide.

Occurrence of disturbance in the state of straight running

Figure 6:
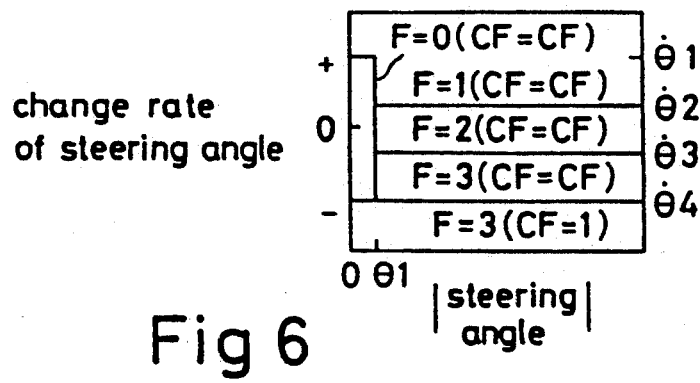
FIG. 6 is a map chart for turning state decision I.

Since the car is in the state of straight running, it is decided that F is equal to 0 (straight running) by the turning state decision I (see FIG. 6). Consequently, disturbance decision is executed (see FIG. 8). If the yaw rate is smaller than $-Y1$ and is greater than $+Y1$, or the lateral acceleration is smaller than $-G1$ and is greater than $+G1$, CF is set to 1 so that it is decided that F is equal to 3 (turning escape) (Steps S38 and S39). Consequently, the turning state decision I is stopped until the yaw rate and lateral acceleration are smaller than the predetermined values. Thus, there is carried out the turning state decision II which also serves as the disturbance decision termination means in FIG. 7.

In that case, if the steering angle is $+\theta 2$ to $-\theta 2$ and the lateral acceleration is $+G1$ to $-G1$ by the turning state decision II, CF is set to 0. Consequently, the turning state decision I is carried out according to the decision of Step S38. If the decision of F=0 is obtained again by the turning state decision I, the disturbance decision in FIG. 8 is executed. If the lateral acceleration or yaw rate is further generated, F is set to 3 again.

Accordingly, if the disturbance does not occur in the state of straight running, the turning state correspondence control is not executed. Consequently, the torque distribution for the wheels 6 to 9 is made uniform. Even if the driver corrects the steering against the disturbance, there is executed the torque distribution control at the time of turning escape until the lateral acceleration, which is equal to or greater than the predetermined value, is eliminated. By the correction control at the time of turning escape in Step S28 shown in FIG. 4, the longitudinal distribution ratio R1 is increased in the minus direction and the torque distribution for the rear wheels 8 and 9 is decreased. Consequently, the lateral slide of the rear wheels 8 and 9 is controlled so that the correction can easily be executed.

According to the above-mentioned embodiment, the lateral acceleration is used for the turning state decision II (turning escape decision termination means). Those skilled in the art will easily understand that the same results can be obtained if the yaw rate is used.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A torque distribution control apparatus for a four wheel drive in which four wheels of a car are driven by engine outputs comprising;
   torque distribution change means for controlling a quantity of said engine outputs to be transmitted to said four wheels so as to change the driving torque distribution for said four wheels,
   means for detecting the steering state of the car,
   means for detecting a lateral acceleration or yaw rate generated on the car,
   running state decision means for deciding whether the car is in the state of straight running, turning start or turning escape on the basis of said steering state thereof,
   torque distribution control means for differently setting the torque distribution ratios of said four wheels at the time of said straight running, said turning start and said turning escape state and for controlling said torque distribution change means on the basis of said torque distribution ratios thus set, and
   torque distribution control regulation means for considering as disturbance said lateral acceleration or yaw rate which is equal to or greater than a predetermined value when said running state decision means decides that the car is in the state of said straight running and for forbidding the torque distribution control of said torque distribution control means based on the running states obtained by said running state decision means.

2. A torque distribution control apparatus for a four wheel drive according to claim 1, wherein said torque distribution control regulation means forcibly makes said torque distribution control means execute the torque distribution control at the time of said turning escape decision irrespective of the decision obtained by said running state decision means.

3. A torque distribution control apparatus for a four wheel drive according to claim 2, wherein said torque distribution control means sets the torque distribution ratio of the front wheels to the rear wheels such that the torque distribution for said rear wheels is made smaller at the time of said turning escape decision than at the time of said straight running and said turning start decision.

4. A torque distribution control apparatus for a four wheel drive according to claim 2, wherein said torque distribution control regulation means includes disturbance decision means for considering as the disturbance said lateral acceleration or yaw rate which is equal to or greater than said predetermined value when said running state decision means decides that the car is in the state of said straight running, interrupting said decision of said running state decision means by said turning escape decision so that said torque distribution control means executes said torque distribution control at the time of said turning escape decision, and turning escape decision termination means for terminating said interruption of said turning escape decision so as to restart said torque distribution control on the basis of said running state decision when said steering angle is smaller than a predetermined angle, and said lateral acceleration or yaw rate is smaller than said predetermined value.

* * * * *